(12) United States Patent
Schmitt et al.

(10) Patent No.: US 11,584,249 B2
(45) Date of Patent: Feb. 21, 2023

(54) METHOD FOR DETERMINING POSITION INFORMATION OF A MOTOR VEHICLE, AND MOTOR VEHICLE

(71) Applicant: AUDI AG, Ingolstadt (DE)

(72) Inventors: Nicholas Schmitt, Ingolstadt (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 307 days.

(21) Appl. No.: 16/629,288

(22) PCT Filed: Aug. 13, 2018

(86) PCT No.: PCT/EP2018/071916
§ 371 (c)(1),
(2) Date: Jan. 7, 2020

(87) PCT Pub. No.: WO2019/048188
PCT Pub. Date: Mar. 14, 2019

(65) Prior Publication Data
US 2021/0101497 A1    Apr. 8, 2021

(30) Foreign Application Priority Data
Sep. 11, 2017   (DE) .......................... 102017215932.4

(51) Int. Cl.
*B60L 53/39* (2019.01)
*H02J 50/90* (2016.01)
(Continued)

(52) U.S. Cl.
CPC ............. *B60L 53/39* (2019.02); *B60L 53/122* (2019.02); *B60L 53/126* (2019.02); *B60L 53/36* (2019.02);
(Continued)

(58) Field of Classification Search
CPC ........ B60L 53/39; B60L 53/126; B60L 53/36; B60L 53/122; H02J 50/90; H02J 50/10;
(Continued)

(56) References Cited

U.S. PATENT DOCUMENTS 3,085,646 A   4/1963  Paufve
4,529,982 A   7/1985  Karlstrom et al.
(Continued)

FOREIGN PATENT DOCUMENTS

DE   2064811 A1   7/1972
DE   3307123 C2   11/1990
(Continued)

OTHER PUBLICATIONS

International Search Report and Written Opinion of the International Searching Authority directed to related International Patent Application No. PCT/EP2018/071916, dated Jan. 9, 2019, with attached English-language translation; 17 pages.
(Continued)

*Primary Examiner* — Ajay Cattungal
(74) *Attorney, Agent, or Firm* — Sterne, Kessler, Goldstein & Fox P.L.L.C.

(57) ABSTRACT

The disclosure relates to a method for determining position information of a motor vehicle, which has an inductive charging device with at least one charging coil, which is in particular situated in the region of the bottom of the vehicle, and a measurement means which is assigned to the charging coil to measure a magnetic field, the method having the following steps: magnetizing, by supplying current to the charging coil, at least one magnetic structure which is situated in or on a surface on which the motor vehicle drives, wherein the structure and further structures are stored together with a position indication for the respective structure in a digital map; measuring, using the measurement
(Continued)

means, measurement data which describe the magnetic behavior of the structure; identifying the structure by evaluating the measurement data; and determining the position information depending on position indication assigned to the identified structure.

12 Claims, 1 Drawing Sheet

(51) Int. Cl.
  *H02J 50/10* (2016.01)
  *B60L 53/126* (2019.01)
  *B60L 53/36* (2019.01)
  *B60L 53/122* (2019.01)
  *G05D 1/02* (2020.01)
  *G08G 1/042* (2006.01)

(52) U.S. Cl.
  CPC ......... *G05D 1/0217* (2013.01); *G05D 1/0225* (2013.01); *G05D 1/0261* (2013.01); *G08G 1/042* (2013.01); *H02J 50/10* (2016.02); *H02J 50/90* (2016.02)

(58) Field of Classification Search
  CPC .. G05D 1/0217; G05D 1/0225; G05D 1/0261; G08G 1/042
  See application file for complete search history.

(56) References Cited

U.S. PATENT DOCUMENTS

| | | | |
|---|---|---|---|
| 6,378,772 B1 | 4/2002 | Yonemura | |
| 2007/0162218 A1* | 7/2007 | Cattin | G08G 1/015 701/117 |
| 2016/0229304 A1* | 8/2016 | Bildstein | B60L 53/36 |
| 2017/0136911 A1* | 5/2017 | Ricci | B60L 55/00 |
| 2018/0182240 A1* | 6/2018 | Baranga | G08G 1/0112 |

FOREIGN PATENT DOCUMENTS

| | | | | |
|---|---|---|---|---|
| DE | 69110525 T2 | 11/1995 | | |
| DE | 69933093 T2 | 3/2007 | | |
| DE | 102016007733 A1 | 2/2017 | | |
| EP | 0067337 B1 | 3/1987 | | |
| EP | 0452280 A1 | 10/1991 | | |
| EP | 2416303 A2 * | 2/2012 | ............ | B60W 30/12 |
| EP | 2416303 A2 | 2/2012 | | |
| JP | H 09292236 A | 11/1997 | | |
| JP | 2001/325691 A | 11/2001 | | |

OTHER PUBLICATIONS

International Preliminary Report on Patentability directed to related International Patent Application No. PCT/EP2018/071916, dated Mar. 17, 2020, with attached English-language translation; 13 pages.

* cited by examiner

METHOD FOR DETERMINING POSITION INFORMATION OF A MOTOR VEHICLE, AND MOTOR VEHICLE

TECHNICAL FIELD

The disclosure relates to a method for determining position information of a motor vehicle.

BACKGROUND

Many driver assistance functions in modern motor vehicles require relatively accurate position information which describes the current position of the motor vehicle, in particular geodetically. In particular, at least partially automatic vehicle guidance functions for autonomous guidance of the motor vehicle may be mentioned here. For these, it is extremely important, for example, to know exactly where on a road the motor vehicle is. Known positioning systems, such as GNSS (Global Navigation Satellite Systems) such as GPS (Global Positioning System), often still exhibit inaccuracies that may cause it to be unclear on which lane of a multi-lane road the motor vehicle is situated, and the like. Other known positioning or localization systems of motor vehicles often still have weaknesses in this regard, for example positioning systems using optical markers, positioning systems based on dead reckoning or combinations of the previously mentioned positioning systems.

In addition, motor vehicles have been proposed which have an inductive charging device for charging a battery assigned, for example, to an electric motor of the motor vehicle. Such an inductive charging device has at least one charging coil, which interacts with an induction unit at the bottom of the vehicle for energy transfer. The charging coil is usually associated with a measurement means for measuring magnetic fields, which can be used in particular to detect possibly flammable objects that are situated between the bottom induction unit and the charging coil, and interfere with the charging operation and/or can cause problems by igniting. In order to achieve an optimal energy transfer for charging the battery of the motor vehicle, the most accurate possible positioning of the motor vehicle relative to the bottom induction unit is useful, for which purpose, for example, radio-based localization methods and/or localization methods using optical markers have been proposed.

EP 0 067 337 B1 relates to the arrangement of a magnetic field probe on a vehicle intended to determine the horizontal components of the earth's magnetic field at the respective location. It is proposed there to attach the probe directly to a ferromagnetic outer wall of the body and to connect it rigidly thereto in order to reduce interactions with the ferromagnetic body.

For determining position information of a motor vehicle by means of magnetic structures, reference is also made to DE 33 07 123 C2, U.S. Pat. No. 4,529,982 A, JP H09-292 236 A and JP 2001-325691 A.

DETAILED DESCRIPTION

Figure 1:
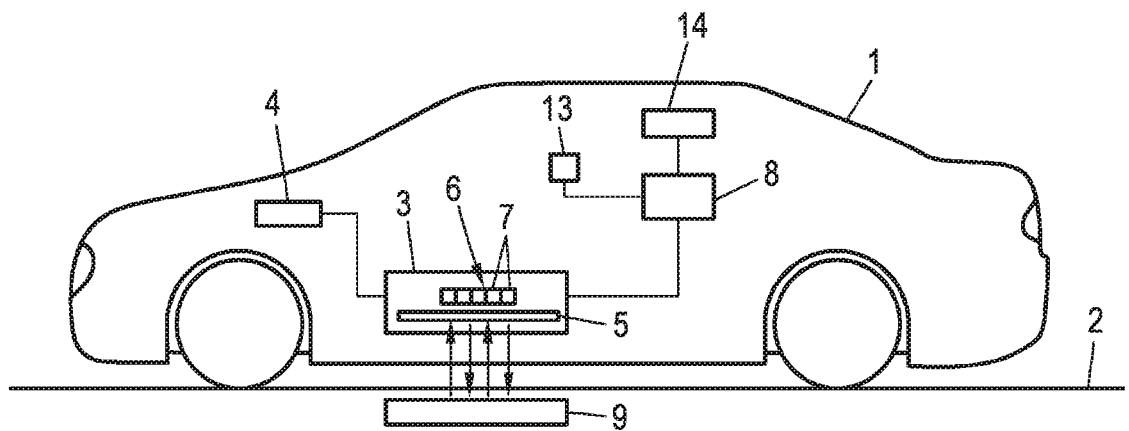
FIG. 1 shows a motor vehicle according to the disclosure on a traveled road.

The disclosure relates to a method for determining position information of a motor vehicle, which has an inductive charging device with at least one charging coil, which is in particular situated in the region of the bottom of the vehicle, and a measurement means which is assigned to the charging coil to measure a magnetic field. The disclosure also relates to a motor vehicle.

Many driver assistance functions in modern motor vehicles require relatively accurate position information which describes the current position of the motor vehicle, in particular geodetically. In particular, at least partially automatic vehicle guidance functions for autonomous guidance of the motor vehicle may be mentioned here. For these, it is extremely important, for example, to know exactly where on a road the motor vehicle is. Known positioning systems, such as GNSS (Global Navigation Satellite Systems) such as GPS (Global Positioning System), often still exhibit inaccuracies that may cause it to be unclear on which lane of a multi-lane road the motor vehicle is situated, and the like. Other known positioning or localization systems of motor vehicles often still have weaknesses in this regard, for example positioning systems using optical markers, positioning systems based on dead reckoning or combinations of the previously mentioned positioning systems.

In addition, motor vehicles have been proposed which have an inductive charging device for charging a battery assigned, for example, to an electric motor of the motor vehicle. Such an inductive charging device has at least one charging coil, which interacts with an induction unit at the bottom of the vehicle for energy transfer. The charging coil is usually associated with a measurement means for measuring magnetic fields, which can be used in particular to detect possibly flammable objects that are situated between the bottom induction unit and the charging coil, and interfere with the charging operation and/or can cause problems by igniting. In order to achieve an optimal energy transfer for charging the battery of the motor vehicle, the most accurate possible positioning of the motor vehicle relative to the bottom induction unit is useful, for which purpose, for example, radio-based localization methods and/or localization methods using optical markers have been proposed.

EP 0 067 337 B1 relates to the arrangement of a magnetic field probe on a vehicle intended to determine the horizontal components of the earth's magnetic field at the respective location. It is proposed there to attach the probe directly to a ferromagnetic outer wall of the body and to connect it rigidly thereto in order to reduce interactions with the ferromagnetic body.

For determining position information of a motor vehicle by means of magnetic structures, reference is also made to DE 33 07 123 C2, U.S. Pat. No. 4,529,982 A, JP H09-292 236 A and JP 2001-325691 A.

The object of the disclosure is to provide a possibility for highly accurate positioning of the motor vehicle that is especially useful for a fully automatic guidance of the motor vehicle.

To achieve this object, a method of the aforementioned type according to the disclosure comprises the following steps:

magnetizing, by supplying current to the charging coil, at least one magnetic structure arranged in or on a surface on which the motor vehicle drives, wherein the structure and further structures are stored together with a position indication for the respective structure in a digital map, measuring, using the measurement means, measurement data which describe the magnetic behavior of the structure, identifying the structure by evaluating the measurement data, and determining the position information depending on position information assigned to the identified structure.

Thus, according to the disclosure, an improved vehicle positioning is proposed by means of active detection of structures acting as position markers. By means of inductive charging devices built into current and future motor vehicles, specifically the charging coils provided therein, a magnetic structure, such as a ferromagnetic material, of specific geometry and/or surface area and/or dimensions, that is set into the traversed ground or arranged thereon, is magnetized, which magnetization can be detected by an imbalance of the magnetic field or by a change in the magnetic field. The structures provided on the base are stored in a digital map, so that after identification of the structure based on the measured data, corresponding position information can be determined.

The proposed active measurement thus introduces a magnetic field which is modified or influenced by the structure, wherein the structures differ sufficiently in their magnetic behavior that identification is possible in at least one unambiguous range around the structure. Such a different magnetic behavior can be achieved by a variation of the geometry of the structures, which will be discussed in more detail below.

It should be noted at this point that a variety of configurations with regard to the active magnetization measurement and the actually recorded measurement data are conceivable. For example, an embodiment is possible in which a structure made of a ferromagnetic material is used, which is magnetized by the active supply of current to the charging coil, after which the resulting (permanent) magnetization is measured by the measurement means. Other embodiments provide for the influence of the magnetic structure, which may also be paramagnetic or diamagnetic, on the makeup or the structure of the magnetic field generated by the supply of current to the charging coil to be described by means of the measured data. In this context, it makes sense in particular also to use the charging coil itself as a measurement means by recording losses occurring due to the magnetic structure as part of the measurement data. Particularly advantageously, however, the measurement data in both cases comprise spatially resolved information on the strength and/or direction of a magnetic field, be it a magnetic field emanating from the ferromagnetic material and/or a magnetic field which is generated by the charging coil and, due to the presence of the magnetic structure, is modified in particular by induced eddy currents.

Moreover, in this context, it is particularly advantageous if a plurality of measurement means, in particular arranged in an array and comprising magnetic field sensors is used. While such measurement means associated with charging coils are already known in principle in order, for example, to detect objects between the charging coil and a bottom induction unit, these measurement means are now supplied for a further, extremely advantageous purpose, namely a significantly improved positioning of the motor vehicle.

To evaluate the measurement data in order to be able to identify a detectable structure due to a corresponding influence or generation of a magnetic field, two basic possibilities are conceivable, which of course can also be used together. Thus, it is initially possible for each structure stored in the digital map to be assigned at least one structural parameter that describes the magnetic behavior of the structure and distinguishes the structure from other structures and is stored therewith, and the structure is identified by comparison of a measurement parameter, derived from the measurement data and corresponding to the structural parameter, with the structural parameter stored in the digital map. In this case, the measurement data are thus evaluated by calculation and/or simulation to determine measurement parameters that correspond to structural parameters assigned to the structures and stored in the digital map, so that by a comparison it is possible to find the structure of which the structural parameters match the measurement parameters, so that an identification of the structure has been made possible.

In addition or as an alternative, however, it is also possible for the structure to be identified by using a classifier of artificial intelligence trained by machine learning. In particular, if the mapping of properties that affect the magnetic behavior of the structures is difficult to perform sufficiently exactly with measurement parameters determinable from the measurement data, it is appropriate to derive corresponding relationships or patterns by artificial intelligence in the context of machine learning. In this case, measurement data of known structures, for which a basic truth (i.e. the traversed structure or its structural parameters) is already known, can be used as training data. Especially when relationships between the magnetic behavior of the structure in particular determined by the geometry of the structure and measurement data recorded by the measurement means are not immediately apparent, the artificial intelligence, especially in the context of "deep learning" techniques, is ideally suited to finding and usably configuring these relationships.

In an advantageous development of the present disclosure, it can be provided that each structure can be identified unambiguously, in particular by the at least one structural parameter, at least within an unambiguous range around the structure. This is always useful if, on the one hand, there is further (position) information that can restrict the search area for identifying the structure within the digital map, so that then a smaller number of different structures must be used overall but, on the other hand, also in cases where the sought position information in any case refers to a local, then not necessarily geodesic property. For example, the unambiguous range can be the transverse direction of a traveled road, so that, for example, different lanes of a road can be provided with distinguishable structures in the transverse direction, so that the identification of the structure leads to position information of a lane assignment. For example, in the transverse direction of a road, structures of different geometric outer shape, such as triangle, circle, square and the like, are embedded in the traveled road, so that when the motor vehicle drives over them measurement results are produced that allow identification of this special structure and thus a lane assignment.

A particularly advantageous embodiment of the present disclosure is provided when initially rough information on the position of the motor vehicle is determined, in particular by a GNSS measurement, wherein the comparison is limited to a search area defined by the rough information within the digital map. In the preferred use of unambiguous ranges as described, the search range is always chosen to be equal to or less than the smallest affected unambiguous range. In this way, therefore, a GNSS measurement, in particular a GPS measurement, is used to restrict the search area within the digital map and thus to allow a faster, more robust identification of the detected structure. Less accurate GNSS information can thus provide the basis for high-accuracy positioning due to active magnetization measurement. In this embodiment, the motor vehicle preferably has a corresponding GNSS sensor.

As already mentioned, it can be provided that the different magnetic behavior of distinguishable structures is caused by a geometry, in particular a surface area and/or dimensions and/or a shape, of the structure. It should be noted that different magnetic behavior can of course also be generated in principle in other ways, for example, by using different materials and the like. However, it is preferred if different structures differ at least in their geometry. Differences in geometry may result from different surface areas/dimensions, thus sizes, as well as different shapes, for example, triangular, square, round and other shapes may be used in the present disclosure. All these different geometries, which are otherwise easily described by structural parameters, have different effects on the active magnetic field measurement result, since magnetic fields are generated/influenced differently.

As an alternative to dedicated magnetic structures in/on the traveled surface, detectable magnetic structures already provided for other purposes can also be used by the method according to the disclosure. For example, it may be provided that at least one measuring loop embedded in the surface is used as a structure for detecting the presence and/or passage of motor vehicles. Such induction loops, which are intended to measure the presence and/or the passage of motor vehicles, are known, for example, from traffic lights. As the induction loop can detect the motor vehicle, it is of course also possible conversely to detect the loop by the motor vehicle, so that it can therefore serve as a structure in the context of the method according to the disclosure. Other magnetizable elements embedded, for example, in a road can of course be used for positioning in the context of the present disclosure.

As already mentioned, the position information may in particular comprise a traveled lane of a road. In particular, a particularly simple implementation of the method according to the disclosure for determining a traveled traffic lane of a road can be achieved when an unambiguous range in the transverse direction is given and different geometries of the structures are used, which in particular can be assigned to specific lanes.

Particularly advantageously, the position information can be used in the fully automatic guidance of the motor vehicle. The motor vehicle can therefore have a vehicle system designed for the fully automatic guidance of the motor vehicle. The highprecision localization of the motor vehicle is one of the essential prerequisites for the successful implementation of autonomous driving maneuvers, so that the position information determined according to the disclosure with high precision provides a useful, easily determinable and robust input value.

In addition to the method, the disclosure also relates to a motor vehicle, comprising an inductive charging device having at least one charging coil, in particular in the region of the bottom of a vehicle, and a measurement means assigned to the charging coil for measuring a magnetic field and a control device designed for carrying out a method according to the disclosure. All statements relating to the method according to the disclosure can be analogously transferred to the motor vehicle according to the disclosure, with which therefore also the already mentioned advantages can be obtained.

Further advantages and details of the present disclosure will become apparent from the embodiments described below and with reference to the drawings.

FIG. 1 shows a motor vehicle according to the disclosure on a traveled road.

Figure 2:
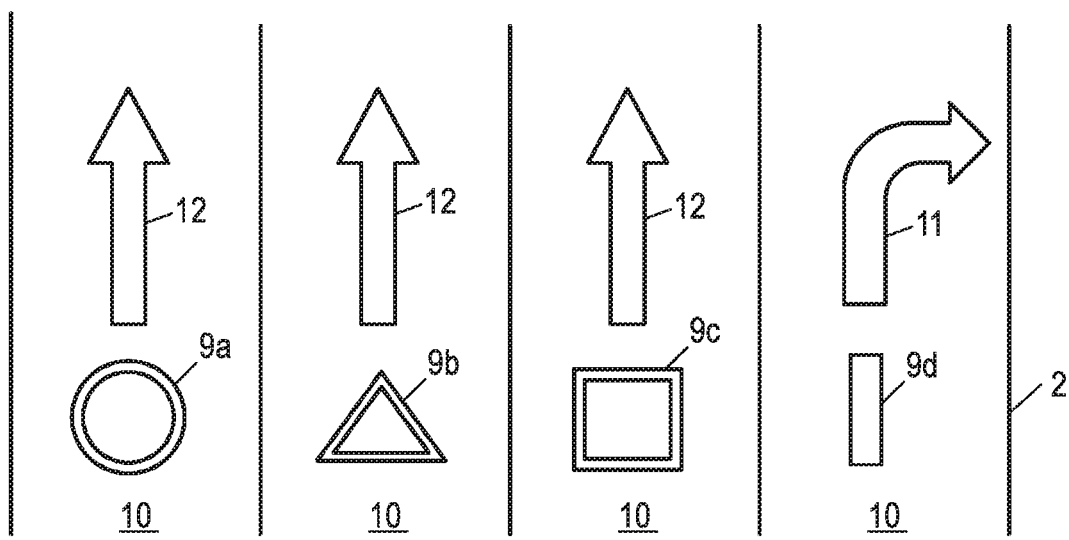
FIG. 2 shows the arrangement of magnetic structures within a road in the lane determination.

FIG. 2 shows the arrangement of magnetic structures within a road in the lane determination.

Figure 3:
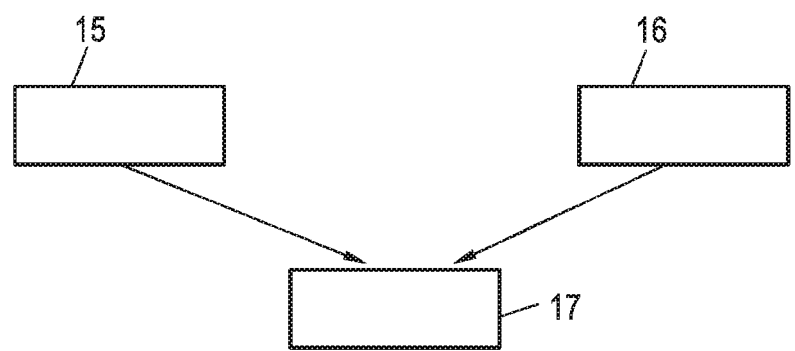
FIG. 3 shows a sketch for explaining an embodiment of the method according to the disclosure.

FIG. 3 shows a sketch for explaining an embodiment of the method according to the disclosure.

FIG. 1 shows a schematic diagram of a motor vehicle 1 according to the disclosure on a road 2. The motor vehicle 1 has an inductive charging device 3 for the inductive charging of an electric battery 4, which may be associated with an electric motor of the motor vehicle. The charging device 3 comprises a charging coil 5, which can interact with a bottom induction unit for energy transmission. A measurement means 6, which in the present case comprises an array of a plurality of magnetic field sensors 7, is assigned to the charging coil. During charging of the inductive charging device 3, the measurement means 6 is used in particular for the detection of objects located between the charging coil 5 and the bottom induction unit.

However, in the present case the measurement means 6 and the charging coil 5 can also be controlled by a control unit 8 of the motor vehicle 1, which is designed to carry out the method according to the disclosure. By means of the control unit 8, a supply of current to the charging coil 5 is possible to detect due to the magnetic behavior of magnetic structures 9, which in the present case are embedded in the traveled surface, in this case the road 2. In other words, structures 9 which are present "unbalance" the magnetic field of the charging coil 5, which in turn can be detected by means of the measurement means 6 in corresponding measurement data. The measurement data 6 are fed to the control device 8 in the exemplary embodiment shown here in order to be evaluated there for the purpose of identifying a detected structure 9. For this purpose, two cumulatively usable options are conceivable. On the one hand, it is possible to derive from the measurement data measurement parameters which are compared, in a digital map containing the structure 9 together with position information, with stored structural parameters assigned to the structures 9, wherein the structure 9 can be determined as the best match of the measurement parameters with the structural parameters. In the present case, the structural parameters describe the magnetic behavior of the respective structure 9, which in this exemplary embodiment is configured differently for different structures 9 by different geometries of the structures 9. The geometry of a structure 9 can include not only its shape but also its horizontal surface area and/or its dimensions, thus its size overall. Not all structures 9 must necessarily be intentionally provided as a position mark, but it is conceivable to use existing structures 9 as position markers, for example, loops embedded in the road surface for the detection of present and/or passing vehicles.

Within the digital map, structures 9 are different within unambiguous ranges, that is, within an unambiguous range around each structure 9, this structure 9 is unique in terms of its magnetic behavior. An example with a specific embodiment, which deals with the determination of position information indicating the traveled lane, is illustrated in FIG. 2. The road 2, which in the present case has four lanes 10, is shown there. Here, the rightmost lane 10, as indicated by the arrow 11, is provided for right turns, the other three lanes, as indicated by the arrow 12, for driving straight ahead. In each of these lanes 10 a respective different magnetic structure 9a, 9b, 9c and 9d is now embedded, in the present case having different geometric shapes and thus showing a different magnetic behavior. The structures 9a to 9d can consist of ferromagnetic, paramagnetic or diamagnetic materials.

A corresponding unambiguous range can be defined here as a transverse direction with respect to the road 2, since in this direction the structures 9a to 9d are different and thus allow a clear track assignment.

However, the procedure according to the disclosure can also be used in a preferred manner for geodetic positioning, that is, structures 9, 9a-9d are assigned geodetic position indications and they can be clearly identified in a geodetically defined unambiguous range. In this case, the motor vehicle 1, cf. FIG. 1, also has a GNSS sensor 13, which supplies rough information on the current position of the motor vehicle 1 determined on the basis of a global navigation satellite system, for example GPS. This rough information is used to define a search area within the digital map which should not be larger than respective unambiguous areas. If a structure 9, 9a-9d, is now traveled over, this can be identified on the basis of the measured data of the measurement means 6 and on the basis of the assigned position highly accurate position information of the motor vehicle 1 can be determined, which for example can be provided to a vehicle system 14 for fully automatic guidance of the motor vehicle 1 or other vehicle systems.

This concept is briefly explained again schematically by FIG. 3. This shows the rough information 15 and the measurement data 16 measured on the basis of the active magnetization measurement, which are combined by the corresponding evaluation by the control device 8 to form highly accurate position information 17.

The invention claimed is:

1. A method for determining position information of a motor vehicle, the method comprising:
   magnetizing, by a charging coil of a charging device of the motor vehicle, a first magnetic structure by supplying current to the charging coil;
   measuring, by measurement means of the motor vehicle, measurement data that describe a first magnetic behavior of the first magnetic structure;
   identifying, by a control device of the motor vehicle, the first magnetic structure by evaluating the measurement data; and
   determining, by the control device of the motor vehicle, the position information based on a first position indication in a local digital map assigned to the first magnetic structure,
   wherein the charging coil of the charging device is situated in a bottom region of the motor vehicle,
   the measurement means are assigned to the charging coil to measure a magnetic field,
   the first magnetic structure is situated in or on a road surface on which the motor vehicle drives,
   the first magnetic structure is situated with a second magnetic structure, and
   a second position indication in the local digital map is assigned to the second magnetic structure.

2. The method according to claim 1, wherein identifying the first magnetic structure further comprises:
   comparing, by the control device of the motor vehicle, a measurement parameter with first and second structural parameters; and
   determining, by the control device of the motor vehicle, the measurement parameter corresponds to the first structural parameter,
   wherein the first and second structural parameters describe magnetic behaviors of the first and second magnetic structures respectively,
   the first structural parameter is different from the second structural parameter,
   the first and second structural parameters are stored in the local digital map, and
   the measurement parameter is derived from the measurement data.

3. The method according to claim 2, further comprising determining rough information on a position of the motor vehicle based on a Global Navigation Satellite Systems (GNSS) measurement, wherein comparing the measurement parameter is limited to a search area defined by the rough information within the local digital map.

4. The method according to claim 2, wherein the magnetic behaviors of the first and second magnetic structures are different from each other because of geometries of the first and second magnetic structures, and the geometries are based on surface areas, dimensions and shapes of the first and second magnetic structures.

5. The method according to claim 4, wherein the geometry of the first magnetic structure is different from the geometry of the second magnetic structure.

6. The method according to claim 1, wherein identifying the first magnetic structure is realized using a classifier of artificial intelligence trained by machine learning.

7. The method according to claim 1, wherein the first magnetic structure is unambiguously identifiable by the structural parameter within an unambiguous range around the first magnetic structure.

8. The method according to claim 1, wherein the first magnetic structure situated in the road surface is used for detecting the motor vehicle or a passage of the motor vehicle.

9. The method according to claim 1, wherein the position information comprises a traveled lane of a road.

10. The method according to claim 1, wherein the measurement means are arranged in an array and comprise magnetic field sensors.

11. The method according to claim 1, wherein the position information is used in a fully automatic guidance of the motor vehicle.

12. A motor vehicle comprising a charging coil of a charging device, a control device and measurement means, wherein the motor vehicle is configured to:
   magnetize, by the charging coil, a first magnetic structure by supplying current to the charging coil;
   measure, by the measurement means, measurement data that describe a first magnetic behavior of the first magnetic structure;
   identify, by the control device, the first magnetic structure by evaluating the measurement data; and
   determine, by the control device, the position information based on a first position indication in a local digital map assigned to the first magnetic structure,
   wherein the charging coil of the charging device is situated in a bottom region of the motor vehicle,
   the measurement means are assigned to the charging coil to measure a magnetic field,
   the first magnetic structure is situated in or on a road surface on which the motor vehicle drives,
   the first magnetic structure is situated with a second magnetic structure, and
   a second position indication in the local digital map is assigned to the second magnetic structure.

\* \* \* \* \*